Aug. 7, 1956 G. M. KELLY 2,757,404
CORD REEL
Filed Jan. 19, 1951 2 Sheets-Sheet 1
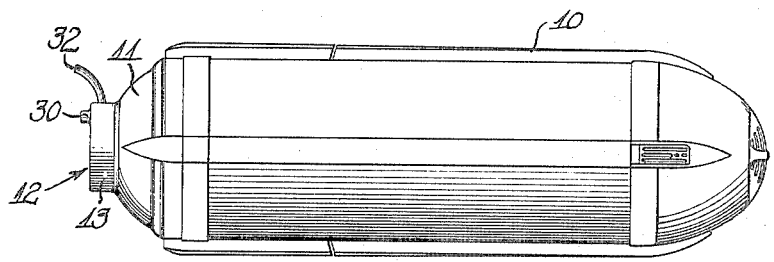
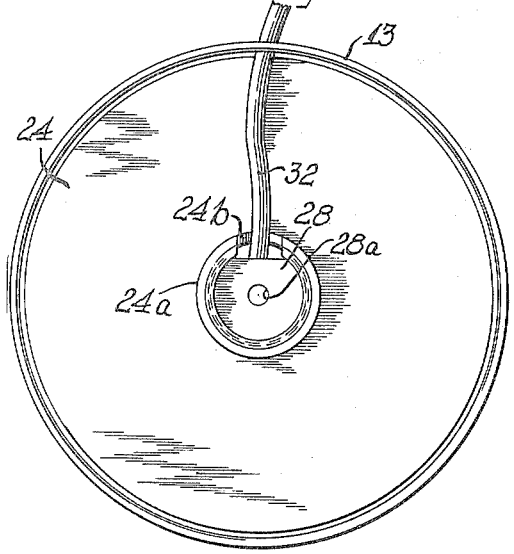 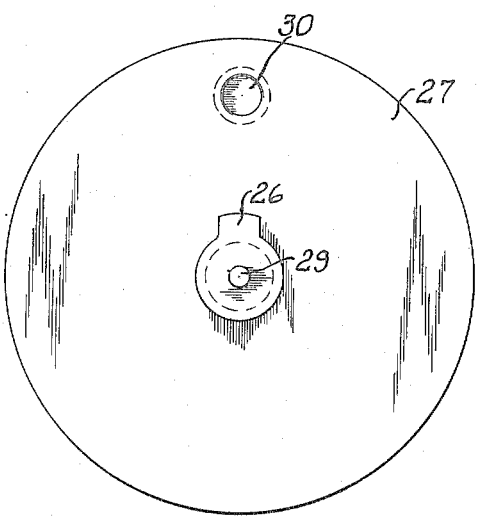
Inventor
George M. Kelly
by Kiel, Sherman, Meroni, Gross Simpson Attys Aug. 7, 1956  G. M. KELLY  2,757,404
CORD REEL
Filed Jan. 19, 1951  2 Sheets-Sheet 2
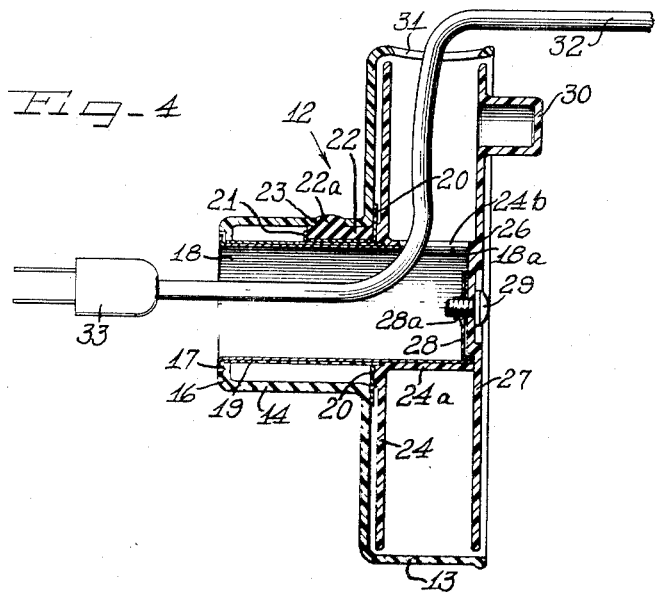
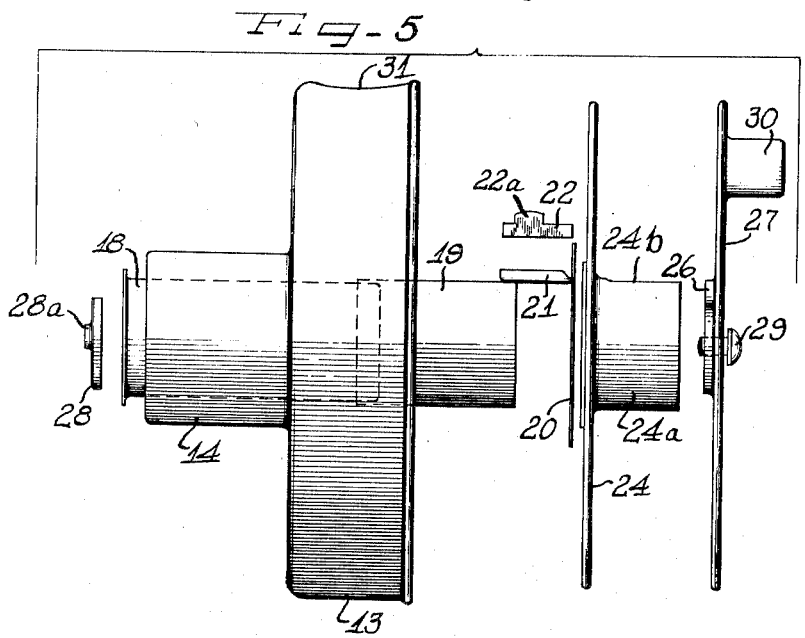
Inventor
George M. Kelly

United States Patent Office

2,757,404
Patented Aug. 7, 1956

2,757,404
CORD REEL

George M. Kelly, Bronson, Mich., assignor to Kingston Products Corporation, Kokomo, Ind., a corporation of Indiana Application January 19, 1951, Serial No. 206,863

4 Claims. (Cl. 15—246)

This invention relates generally to reel mechanisms for storing lengthy cord, for example, electric conductor leads, and more particularly to a novel and improved cord reel mechanism which can be advantageously employed in connection with electrical appliances to safely and conveniently store the electric conductor leads associated therewith when not in use.

According to the general features of the present invention, a cord reel assembly is provided comprising a hollow housing having a cord aperture therein and a reel is journaled in the housing for rotation. The reel is preferably provided with a hollow hub portion having an opening through which a cord may be extended, the cord also being threaded through the aperture in the hollow housing. Rotation of the reel will wind the cord around the hub portion and store same in a compact unitary assembly within the housing structure.

The housing provided in accordance with the teachings of the present invention may conveniently include a protruding portion having yieldable locking means thereon to insertably engage the walls of a nozzle aperture in an electrical appliance such as a vacuum cleaner of the tank-type.

The cord reel assembly of the present invention, therefore, can be advantageously exploited to store the electrical conductor leads of a tank-type vacuum cleaner when not in use and the cord reel assembly may have the cord freely threaded therethrough so that normal operation of the electrical appliance may be effected without undue interference.

It is an object of the present invention, therefore, to provide a cord reel mechanism whereby the cord may normally be threaded through the mechanism and freely movable therethrough and may be selectively wound around the hub portion of a reel element to be stored compactly and safely.

Another object of the present invention is to provide an improved cord reel assembly for electrical appliances, such as vacuum cleaners of the tank type.

Yet another object of the present invention is to provide a cord reel assembly which may be economically produced from a reduced number of simplified elements and which will yet be completely efficient for its intended purpose.

Many other features, advantages and additional objects of the present invention will become manifest to those versed in the art upon making reference to the detail description which follows and the accompanying sheets of drawings in which a preferred embodiment of a cord reel mechanism provided in accordance with the principles of the present invention is set forth.

On the drawings:

Figure 1 is a side elevational view of a tank type vacuum cleaner having a cord reel assembly according to the present invention associated therewith;

Figure 2 is an enlarged end elevational view of the cord reel assembly having parts thereof removed so that additional details of construction may be clearly understood;

Figure 3 is an elevational view of the outer reel plate provided for the cord reel assembly of the present invention;

Figure 4 is a cross-sectional view with parts shown in elevation of a cord reel assembly according to the present invention; and Figure 5 is an exploded elevational view of the cord reel assembly shown in Figure 4 to illustrate additional details of construction.

As shown on the drawings:

Although the principles of the present invention are generally applicable to any environment where it is necessary to safely store a lengthy cord member in a compact arrangement, the principles of the present invention find a particularly useful application when employed in connection with electrical appliances such as a tank-type vacuum cleaner indicated in Figure 1 by the reference numeral 10.

The cleaner 10 is of a well-known construction and includes at one end thereof a head member 11 having a nozzle aperture in which is yieldably mounted a cord reel assembly indicated generally by the reference numeral 12.

The cord reel assembly 12 comprises a generally cylindrical open-ended housing 13 substantially closed at one end to terminate in an open-ended reduced diameter neck portion 14. It will be understood that the housing 13 may be made of any suitable material, however, it has been found that the housing 13 may be conveniently fabricated as a plastic molding, thereby to enhance the aesthetic appearance thereof as well as to provide a housing member of maximum strength and minimum weight.

The end of the neck portion 14 is provided with a radially inwardly extending flange 16 recessed as at 17 to receive the flared end of a swivel tube 18. The swivel tube 18 extends through the neck portion 14 and into the housing 13. A swivel sleeve 19 is also provided between the swivel tube 18 and the neck portion 14 whereby the swivel tube 18 is journaled for rotation in the neck portion 14 and the housing 13.

A swivel aligning plate 20 having an axially extending support portion 21 is employed to medially align the tubular swivel members. The support portion 21 is constructed to receive and position a lock 22 made of a suitable resilient material such as rubber or the like and having a nubbin 22a adapted to extend through an aperture 23 formed in the neck portion 14 of the housing 13.

A reel member is provided to rotate in the housing 13 and includes an inner reel plate 24 having a hollow hub portion 24a suitably slotted as at 24b to receive a key 26 formed on an outer reel plate 27. An aperture 18a is also provided in the swivel tube 18 and is arranged to lie in registry with the slotted portion 24b of the inner reel plate 24.

A nut member 28 having an extruded threaded portion 28a receives a screw 29 in threaded assembly therewith, the screw 29 extending through the key 26 of the outer reel plate 27. It will be understood that the swivel tube 18 together with the inner reel plate 24 and the outer reel plate 27 and the nut member 28 will be locked for co-rotation which movement may be imparted to such sub-assembly by a knob 30 formed as integral boss portion on the outer reel plate 27.

A radial opening 31 is provided in the housing 13 through which may extend a cord 32. The cord 32 is the usual electric cord of a vacuum cleaner which is fitted at one end with a plug adapted to be plugged in the socket of a domestic electrical current supply and which is adapted at the other end to be connected in circuit with the electric motor of the vacuum cleaner. The cord 32 passes through the housing 13, through the slotted apertures 24b and 18a and into the swivel tube 18. A male plug 33 is shown connected on the end of the cord 32 and it will be understood from referring to Figure 4 that the cord 32 may be freely threaded through the cord reel mechanism 12 with substantially no interference to normal handling of the cord 32 and plug 33.

If the cord reel mechanism 12 is employed in connection with the vacuum cleaner 10, it will be understood that the cord reel mechanism 12 will be removed from the head member 11 and the entire cord 32 will probably be extended to afford the operator full access to the cleaning area.

To safely and conveniently store the cord 32 in the housing 13, the cord 32 is preferably retracted until the plug 33 is nested within the swivel tube 18. Rotation of the reel assembly upon turning the outer reel plate 27 through the knob 30 will result in the cord 32 being wound around the hub portion 24a of the inner reel plate 24 whereupon the entire cord will be quickly wound up between the inner and outer reel plates 24 and 27, respectively.

The neck portion 14 may then be inserted into the nozzle aperture of the head member 11 and the nubbin 22a will yieldably engage a cooperating mating latch (not shown) conventionally provided in the nozzle aperture of a tank type vacuum cleaner such as is indicated at 10.

Although other materials may be provided, it may be noted that the inner reel plate 24 and outer reel plate 27 may also be conveniently fabricated from a molded plastic thereby enhancing the utility and aesthetic aspects of the cord reel mechanism 12.

Although various minor structural modifications might be suggested by those versed in the art, it should be understood that I do not wish to be limited to the precise structural details herein described by way of illustrative example but wish to embody within the scope of this patent all such modifications as reasonably and properly come within the scope of my contribution to the art.

I claim as my invention:

1. A cord reel adapted for use in a tank type vacuum cleaner assembly of the type including a casing formed with a discharge opening therein for the passage of air, said cord reel assembly comprising a hollow cylindrical housing having at least one flat side wall and an open ended reduced cylindrical neck portion projecting from said flat side wall adapted to be connected to the discharge opening of a tank type vacuum cleaner, said housing having a radial cord aperture formed therein, a reel in said housing having a hollow reel hub, a swivel tube in the hub and extending through the interior of said neck portion with an open end at the end of said neck portion, said swivel tube rotatably journalling said reel in said housing, said reel hub and said tube having a radial opening formed therein which is adapted to be aligned with said cord aperture in one position of the reel, said cord reel adapted to receive an electrically conductive cord of the vacuum cleaner extended through said cord aperture, through said radial opening and through said open end of said reel hub, said reel hub adapted to have the plug of the cord nested therein, and means to rotate said reel to wind the cord around the reel hub and onto said reel.

2. A cord reel adapted for use in a tank type vacuum cleaner assembly of the type including a casing formed with a discharge opening therein for the passage of air, said cord reel assembly comprising a hollow cylindrical housing having a radial cord aperture formed therein, a reel journaled in said housing for rotation and having a hollow reel hub, said reel hub having a radial opening formed therein which is adapted to be aligned with said cord aperture in one position of the reel, said cord reel adapted to receive an electrically conductive cord of a vacuum cleaner extended through said cord aperture and through said radial opening into said reel hub, and means to rotate said reel whereupon rotation of said reel will wind the cord around said reel hub onto said reel, said housing having a protruding neck portion at one side thereof, a rotatable tube extending through the interior of said neck portion and connected to said hollow reel hub of said reel to support said reel for rotation, said tube having an opening in registry with said radial opening to pass the cord, said neck portion of said housing constituting a support member for said cord reel assembly, said tube and said neck portion being open at one end to freely pass said cord, and fastening means on said neck portion of said housing adapted to couple said housing to a vacuum cleaner.

3. A cord reel for use in a tank type vacuum cleaner assembly of the type including a casing formed with a discharge opening therein for the passage of air, said cord reel comprising a hollow housing having a reduced neck portion projecting from one side thereof adapted to be connected to a vacuum cleaner casing at the discharge opening thereof and said housing having an aperture formed in a side wall, a tube in said housing extending through the inside of said neck portion and rotatably supported thereby and said tube having an open end extending to the exterior of said housing, a reel having a hollow hub portion connected to and supported by said tube for co-rotation, said reel further including a pair of spaced apart reel plates on said hub portion extending radially outwardly thereof and being rotatable in said housing by said hub portion, said hub portion having an opening formed therein between said reel plates and adapted to be aligned with said wall aperture in one position of said reel, said cord reel adapted to receive an electrical cord of a vacuum cleaner extended through said wall aperture, between said reel plates, through said opening in said hub portion and out of said open end of said tube for normal free movement through said cord reel, said reel having rotating means to wind up said cord on said hub portion between said reel plates and with said tube being adapted to nest a plug connector of the cord when the cord is wound on the reel.

4. A cord reel for use with a tank type vacuum cleaner having a casing formed with a nozzle aperture therein for the passage of air comprising a generally cylindrical housing member having a flat side wall and a reduced diameter neck portion extending axially from said side wall, a swivel tube rotatably mounted in said neck portion and extending into said housing member, a reel carried by said swivel tube for rotation in said housing member, means to rotate said reel, said housing having a radial cord aperture formed in a side wall thereof, said swivel tube and said reel having a radial opening formed therein adapted to be aligned with said cord aperture at one position of said reel, said cord reel adapted to receive an electric cord of a vacuum cleaner extended through said cord aperture, through said radial opening, and out through said neck portion, said neck portion adapted to nest one end of the cord when said reel is rotated to wind up the cord in said housing, and coupling means formed on said neck portion adapted to removably connect said cord reel assembly to the nozzle aperture of a vacuum cleaner.

References Cited in the file of this patent

UNITED STATES PATENTS

| | | |
|---|---|---|
| 1,064,883 | Bergland | June 17, 1913 |
| 1,171,745 | Mundy | Feb. 15, 1916 |
| 1,643,725 | Price | Sept. 27, 1927 |
| 1,782,669 | Turner | Nov. 25, 1930 |
| 1,904,000 | Hoyt | Apr. 18, 1933 |
| 2,053,458 | Black | Sept. 8, 1936 |
| 2,181,521 | Reade | Nov. 28, 1939 |
| 2,231,852 | Lear | Feb. 11, 1941 |
| 2,306,611 | Benjamin | Dec. 29, 1942 |
| 2,322,038 | Lofgren | June 15, 1943 |
| 2,391,141 | Dour et al. | Dec. 18, 1945 |
| 2,543,176 | Komassa | Feb. 27, 1951 |
| 2,572,856 | Hallberg | Oct. 30, 1951 |